Nov. 10, 1964      G. BUTLER      3,156,363

VINER AND SEPARATOR MACHINES

Filed Feb. 3, 1961      3 Sheets-Sheet 1

INVENTOR.
GEORGE BUTLER
BY
Reynolds & Christensen
ATTORNEYS

INVENTOR.
GEORGE BUTLER
BY
Reynolds & Christensen
ATTORNEYS

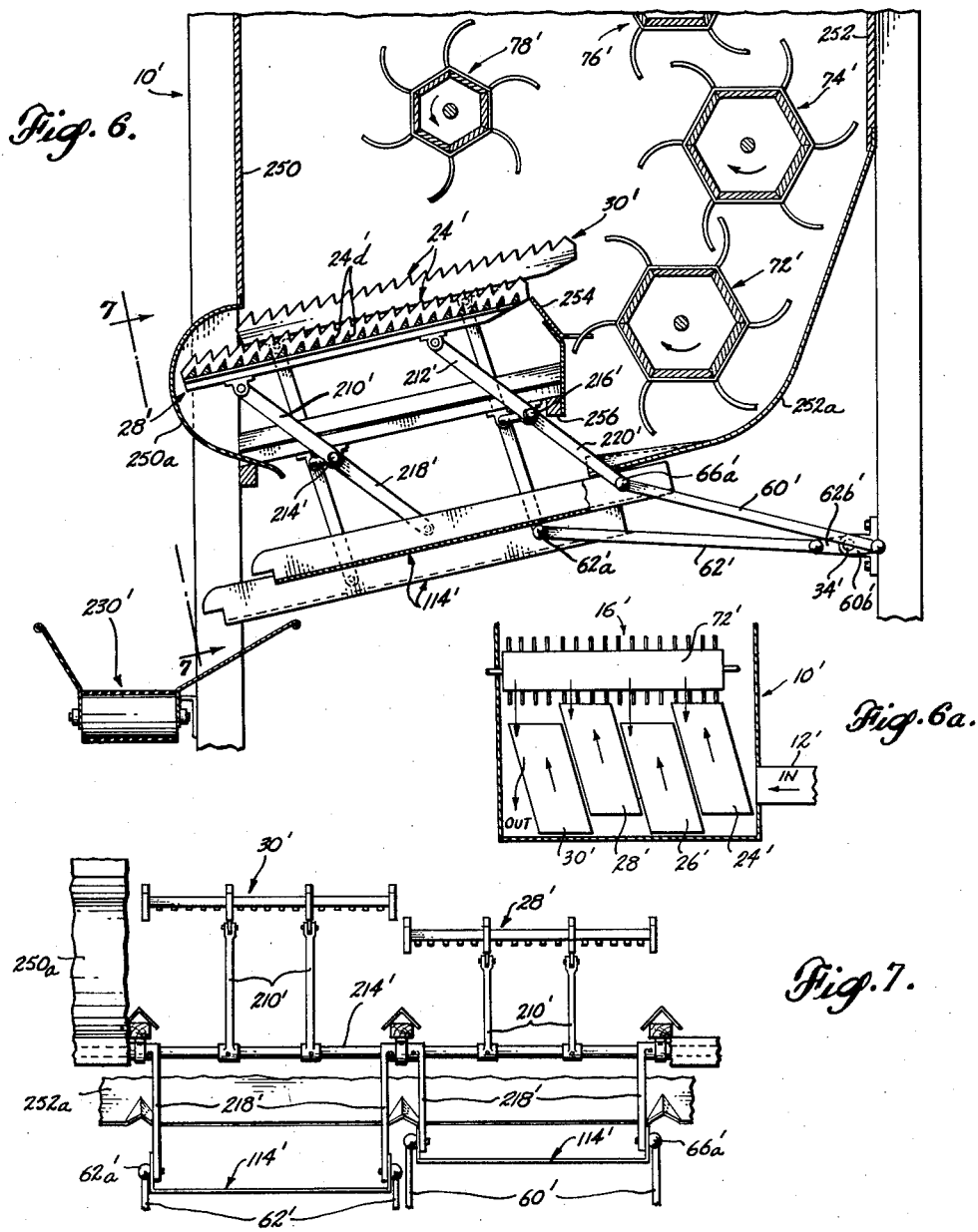

United States Patent Office 3,156,363
Patented Nov. 10, 1964

3,156,363
VINER AND SEPARATOR MACHINES
George Butler, P.O. Box 326, Monroe, Wash.
Filed Feb. 3, 1961, Ser. No. 86,963
3 Claims. (Cl. 209—112)

This invention relates to improvements in apparatus for threshing or vining and separating fruit, such as peas, beans, etc., from the vines, hulls and chaff, and more particularly concerns machines which will operate effectively and efficiently despite wide variations in the moisture condition and other characteristics of the harvested crops. The invention is herein illustratively described by reference to its presently preferred embodiments; however, it will be recognized that certain modifications and changes therein with respect to details may be made without departing from the underlying features involved. The present application is a continuation-in-part of application Serial No. 828,379, now Patent No. 3,046,992, filed July 20, 1959 entitled Viner and Huller.

Peas and other legumes or similar crops have for some time been harvested by cutting and gathering the vines which are then threshed in order to hull the fruit and separate it from the plant materials. Large investments have been expended in attempts to develop satisfactory vining and hulling machines which would efficiently separate the peas and similar crops from the plant materials without bruising or splitting the fruit and without appreciable losses due to insufficient threshing. Variations in moisture in and upon the vines has caused problems as has variations in other characteristics of the fruit, such as the degree of ripeness. Also a problem has been the efficient cleaning of the threshed fruit so as to eliminate chaff and other lightweight plant materials which do not remain with the vines on threshing.

A broad object of this invention is to provide an improved machine of the type indicated which will efficiently clean the separated fruit without difficulties of the type described. A further object is to provide a compact, simple and reliable combined reseparating and recleaning device by which initially threshed vines may be reprocessed to recover otherwise lost fruit which had failed to separate therefrom, and by which such fruit as well as fruit initially separated from the vines may be efficiently cleaned and recleaned in order to eliminate chaff and other similar material.

A related object is such a machine which is relatively inexpensive to manufacture and which will be easily maintained and cleaned.

The improved machine is adapted for use in a variety of ways and with a variety of associated apparatus. For example, it may be used in conjunction with existing vining and hulling machines, as a means to reclean the fruit and to reprocess the vines to recover otherwise wasted fruit which failed to separate. It may also be used as part of a novel combined threshing and fruit separating machine including features of the type disclosed in the abovesaid parent application Serial No. 828,379. Alternatively, features thereof may be used in still other machines and in still other combinations, including the novel recleaning apparatus featuring the inclined recleaning pan or plate reciprocated to effect the desired separating action.

A novel feature of the invention also resides in the combination shaker ramp and recleaning ramp or plate utilizing common support and reciprocation mechanism, such as copivoted rockers arms which support and guide the two members in mutually superposed relationship to reciprocate in defined lines of motion so as to shake and advance vines deposited on the overlying shaker ramp and so as to reclean the fruit shaken from those vines and dropping onto the inclined recleaning plate, in some instances with fruit deposited thereon from separate threshing apparatus.

In accordance with still other features the combined shaker ramp and recleaning plate having the common actuating mechanism are incorporated in a total threshing machine also including rotary beater means against which the vines are advanced by the reciprocated shaker ramp along a line which is angled in relation to the rotational axis of the beater means, whereby the vines progress laterally along the shaker ramp for ultimate discharge from the machine. A machine incorporating such a combination can be made compact and is especially well suited for portable embodiments as well as fixed installations, among other advantages such as those mentioned hereinabove.

These and other features, objects and advantages of the invention will become more fully evident from the following description thereof by reference to the accompanying drawings.

FIGURE 6 is a sectional side view of a combined huller and viner machine with the novel separator or recleaning mechanism and shaker ramp mechanism having common actuating means.

FIGURE 6A is a simplified top view of the combined machine shown in FIGURE 6, illustrating the angled relationship of the beater axes and shaker ramp lines of motion, with resultant lateral progression of the vines through the machine.

FIGURE 7 is an end view of the machine shown in FIGURE 6 taken on line 7—7 in the latter figure.

Figure 1:
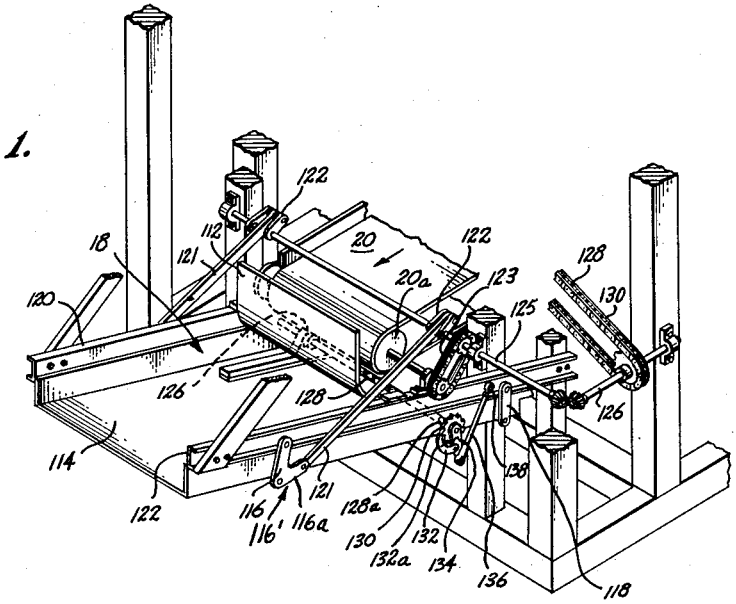
FIGURE 1 is a perspective view of a recleaning or separating device, the view showing part of a belt conveyor for delivering materials to the inclined separator plate therein.
Figure 2:
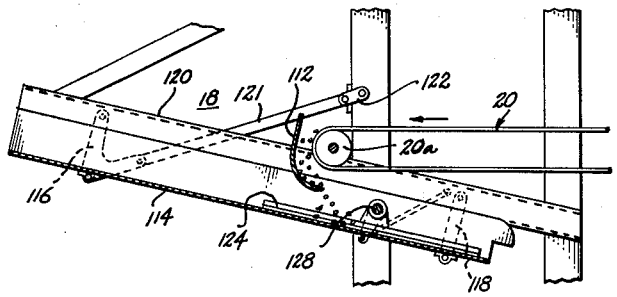
FIGURES 2 and 3 are operating sectional side views of such a device.
Figure 3:
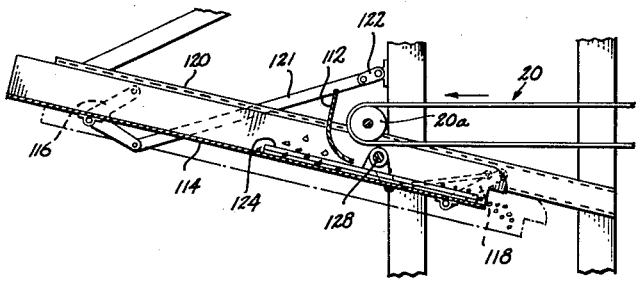

Referring to FIGURES 1, 2 and 3, the illustrated recleaning or chaff separating mechanism is applicable in any of different embodiments for use with any of various kinds of threshing machines or otherwise. In the case of preparing peas for packing it is necessary with known types of threshing machines to reclean the peas before packing since it is virtually impossible to eliminate small pieces of vines and hulls which are mixed with the peas as they leave the threshing machine. The discharge conveyor 20 shown in the drawings constitutes a representative means to deliver the mixed peas and chaff to the device. As the peas reach and drop over the end of the discharge conveyor 20, they are carried against the concave side of the curved deflector plate or chute 112. This plate has an upright upper portion acting as a stop which arrests the peas in their forward motion established by conveyor 20. The lower portion of the plate curves progressively toward the horizontal in the direction toward the conveyor. Peas and chaff which roll and slide down the deflector plate receive momentum which tends to carry them in a generally horizontal direction beyond the lower edge of the deflector plate. However, the peas being round and dense and tending to move faster than the lighter chaff material receive a greater component of horizontal motion and have less air resistance in proportion to that momentum than does the lighter chaff, hence the peas drop onto the underlying separator pan 114 at a point considerably removed from the point of descent of the chaff. The fruit-supporting pan or ramp 114 is sloped upwardly in the direction opposite the direction of discharge of the materials from the deflector plate or chute 112. Consequently, the initial horizontal component of motion of the peas starts them rolling down the incline of the pan 114.

Unfortunately not all of the peas, particularly the smaller ones, are separated in this manner from the chaff, particularly the heavier pieces of chaff. Consequently the separating or recleaning device must perform an additional separating function beyond that produced by the action of plate 112. This it accomplishes by mounting the trough-like pan 114 to reciprocate on sets of pivoted links 116 and 118 which together with the pan itself and the supporting frame members 120 and 122 form a parallelogram linkage. These sets of links are pivotally mounted in spaced relation on the sloping frame members 120 and 122 positioned adjacent respectively opposite sides of the pan. Each link 116 comprises one arm of a bell crank 116', the opposite arm of which, 116a, is pivotally connected to the associated connecting rod 121. The opposite end of the connecting rod is, in turn, pivotally connected to the continuously rotated crank 122. The two cranks 122 are rotated by a shaft 125 coupled rotatively to the shaft 126 through bevel gears. The shaft 126 in turn is driven by a chain 128 which encircles a sprocket 130 on such shaft. The conveyor roll or sheave 20a is turned by a chain and sprocket drive 123 coupled to the shaft 125 (FIGURE 1). As the crankshaft 125 rotates, the bell crank 116' is reciprocated angularly between its position shown in FIGURE 2 and its position shown in FIGURE 3, which causes the pan to move bodily in a pitching motion which follows an arc approximating a straight line extending with a component (approximately six inches) lengthwise of the pan and also a component (approximately three inches) vertically of the pan. The motion is predominately in an inclined direction sloped in the direction of the inclined plate 114 but at a materially steeper angle than the incline of the plate. The successive positions of the pan are parallel to each other because of the supporting parallelogram linkage.

This repeated abrupt reciprocation of the pan causes the materials deposited thereon to be pitched upwardly and toward the upper end of the pan, and left momentarily suspended in the air as the pan is suddenly retracted on its return stroke. Peas and chaff alike are flung into the air in this manner. However, the peas, being heavier and more dense, drop back more quickly than the chaff onto the pan and roll downwardly before the chaff material alights. By the time the chaff alights, the pan is approaching or has reached its retracted position, so that the chaff lands farther up the pan than the position it previously occupied. The peas, on the other hand, returning quickly to the pan, have landed near the spot originally occupied, and with the aid of gravity as well as the return motion of the pan the peas have rolled down the pan to still lower positions. The overall effect is to cause the chaff to migrate progressively up the incline of the pan whereas the peas are caused to migrate and roll progressively down the pan in the opposite direction. This separating action proves to be very effective and is capable of separating the smallest peas from the types of chaff and foreign materials normally encountered. The heavier and larger peas, of course, are readily separated and usually roll down the pan independently of the chaff by virtue of the action of the curved deflector 112.

In some instances, particularly when the crop is wet with rain or dew, there is a tendency for the chaff and smaller peas to stick to the pan generally in the vicinity where they are deposited after leaving the separating deflector 112. In order to prevent accumulation of this material, which tends to impair the effectiveness of the separator, a scraper blade 124 extending longitudinally of the pan and in contact therewith is mounted on a carriage 126' which comprises a traversing nut engaging the doubly threaded feed screw or cam 128. The two sets of threads of the feed screw 128 have respectively opposite pitch so that the scraper will progress first to one end of the feed screw 128 and then, by a connection between the ends of the threads, will progress to the opposite end thereof. Thus the scraper reciprocates back and forth across the pan, as the feed screw continues to rotate in the same direction. The action is much the same as that found in the conventional level-wind fishing reel.

In order to rotate the feed screw continuously during reciprocation of the pan and to provide for mounting of the feed screw on the pan itself, the feed screw carries and is supported by a shaft 128a which projects through one side flange of the pan. A ratchet wheel 130 is mounted on this projecting shaft and is engaged by a pivoted ratchet 132 supported on a crank arm 134 carried pivotally on the shaft. The projecting end of the crank arm is pivotally connected by a link 136 to a fixed pivot 138 on the side member 122. A spring 132a maintains the ratchet against the ratchet wheel. Thus, as the pan reciprocates the fixed mounting of the link 136 at 138 causes the crank 134 to be reciprocated angularly about the axis of the feed screw. During one direction of such reciprocation, the feed screw is rotated whereas in the opposite direction it remains stationary due to the ratchet action. The scraper is thus caused to traverse the pan as long as the pan reciprocates.

Figure 5:
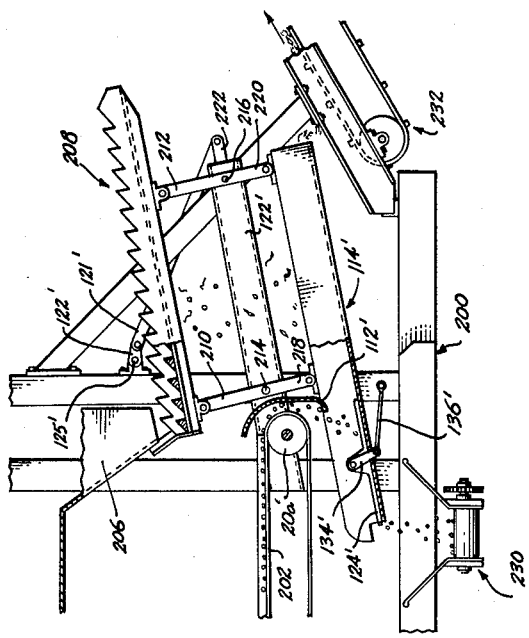
FIGURES 4 and 5 are sectional side views of a combined reprocessing and cleaning machine for use in conjunction with existing viner and huller machines.
Figure 4:
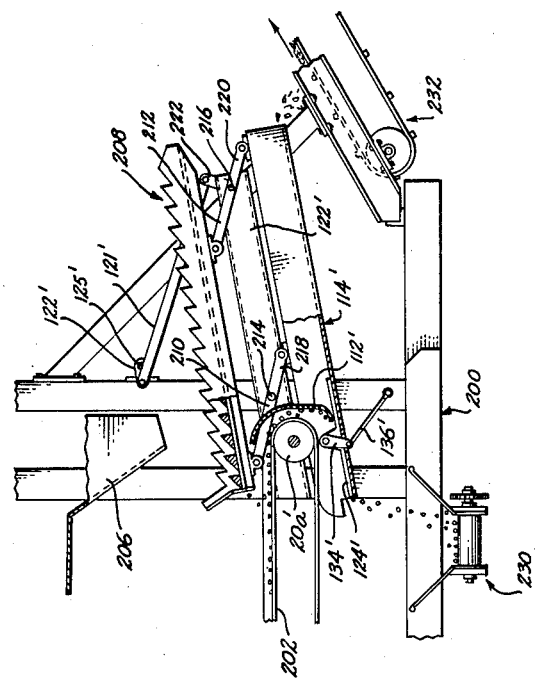

In the combined vine reprocessing and pea recleaning apparatus illustrated in FIGURES 4 and 5 there is provided a device which may be used as auxiliary equipment to existing or other threshing machines which may not be fully effective to remove all of the peas from the vines nor to sufficiently clean the peas of chaff and other light-weight materials preparatory to packing the peas. This machine may, of course, be used with other legumes or similar crops as well as peas.

In these figures the machine frame 200, which may be adapted for mobile or portable applications as well as for stationary applications, supports one end of a belt conveyor 202 which delivers the mixed peas and chaff onto the recleaning plate or ramp 114'. A delivery chute 206 is also supported on the frame 200 in a position to deliver the threshed vines onto the inclined feed rack or shaker ramp 208. The rack 208, of open, preferably grid-like construction, is or may be similar to the feed racks 24, 26, 28 or 30 illustrated and described in the above-cited parent application, except in this case for the fact that the crossbars of the rack are perpendicular to the longitudinal members thereof since there is no requirement of lateral motion of the rack-borne materials. The rack is pivotally mounted, in an inclined position, on the swinging ends of pairs of rocker arms 210 and 212 which in turn are rigidly supported on the rock shafts 214 and 216, respectively. These shafts extend in parallel relationship between the inclined frame members 122'. Extending oppositely from the arms 210 and 212 are additional pairs of rocker arms 218 and 220 whose swinging ends are pivotally connected to the upturned side flanges of the inclined recleaning plate 114' to support the latter in a similar (to the rack) inclined position, as shown. The rock shaft 216 is reciprocated back and forth by the drive mechanism comprising the crank arm 222 on the shaft, and a drive link 121' interconnecting such arm and the driving crank 122' on a continuously rotated drive shaft 125'. As the drive shaft 125' rotates, the rack 208 and the plate 114' reciprocate oppositely, each through a succession of parallel positions extending in a line which is inclined in the same sense as the inclination of the rack and plate but at a greater angle of inclination. In this case the line of movement is not a straight line but approximates a straight line, since it represents the arc of a circle defined by the swinging ends of the respective sets of rocker arms which support and guide such rack and such plate. In FIGURE 4 the reciprocable parts are shown in one extreme of motion, whereas in FIGURE 5 they are shown in the opposite extreme position of motion, the total angle of swing preferably being somewhat less than 90 degrees. The movement is sufficiently rapid and the stroke is such that the vines are shaken rapidly or vigorously on the rack as are the peas and chaff on the plate.

As a result of this action, any loose peas still clinging to or mixed with the vines discharged from the chute 206 onto the rack 208 are dislodged and are freed to drop down through the rack openings and onto the plate 114'. These peas and any chaff and other small bits of plant material dropping onto the plate are separated from each other as a result of the novel action of the separator plate 114' as previously described.

Parts which operate in conjunction with or comprise part of the recleaning mechanism associated with plate 114' and which correspond to those parts appearing in the preceding embodiment shown in FIGURES 1, 2 and 3, bear similar reference numerals primed and require no separate description at this point.

A belt conveyor 230 is disposed in receiving position beneath the lower end of the recleaning plate 114' to receive the peas or other fruit dropping from such plate, whereas a discharge conveyor mechanism 232 is mounted in receiving position beneath the discharge ends of the rack 208 and plate 114' in order to receive the reprocessed vines and other plant materials discharged from the racks and from the plate 114', respectively.

Such a mechanism may therefore be incorporated in a packing plant production line or in a field threshing machinery production line as a means to clean the preliminarily processed peas and as a means to reprocess the vines to recover any fruit not removed in the normal or initial threshing operation. It is found that the recovery of peas from initially processed vines by this apparatus is sufficient to more than justify the investment in the additonal apparatus, and that the efficient recleaning of peas performed by the same apparatus eliminates any necessity for further processing or cleaning in the packing plant as was previously necessary or desirable.

One of the important features of novelty in the mechanism shown in these two figures is the advantage of using a combined supporting and actuating mechanism for the two ramps, which was made possible by the novel use of shaker and separator devices which relay in principle upon the same type of mechanical motion in order to perform their respective functions. It is also found that such an arrangement, preferably featuring the use of sets of rocker arms mounted on common rock shafts, makes for a very compact, efficient and easily manufactured and maintained mechanism. Such a mechanism additionally has the advantage of permitting infeed of materials (i.e., reprocessable vines and initially separated or threshed fruit) from the same side of the machine while permitting use of a single or common discharge conveyor for the waste products on the opposite side thereof.

In the combined threshing machine and fruit cleaning machine depicted in FIGURES 6, 6A and 7 the principles inherent in the combined mechanism of FIGURES 4 and 5 and certain principles inherent in the disclosure of the parent application have been extended and combined to achieve a total threshing and processing machine which is highly efficient, effective and compact, and which is suitable for portable use as well as stationary installation. This machine comprises the main frame 10' within and upon which are mounted the rotary beaters 72', 74', 76' and 78' corresponding to the similarly arranged beaters bearing like numerals (unprimed) in the parent application cited above. Likewise the shaker ramps or racks 24', 26', 28' and 30' have a similar function in relation to the rotary beaters in this case as in the parent application, wherein the similarly constructed racks bear the same reference numerals unprimed. In this instance the racks, such as 30' and 28', are supported and actuated by sets of rocker arms 210' and 212' corresponding to the rocker arms 210 and 212 in the embodiment of FIGURES 4 and 5. A recleaning or separator pan 114' is supported and actuated by the sets of rocker arms, directly oppositely from the associated arms 218' and 220' supporting the racks. The sets of arms are mounted on the respective rock shafts 214' and 216' as shown which are so oriented in relation to the rotational axes of the rotary beaters that the lines of motion of the respective racks 24', 26', 28' and 30' are angled in relation to the rotational planes of the individual beater elements as shown by the arrows in FIGURE 6A, as in the above-cited parent application. As a result, the recirculated vines under process are caused to migrate progressively along the row of racks from the end of the machine at which the input conveyor 12 delivers the vines to the end at which the processed vines are discharged. Drive links 62' are connected through universal couplings 60'a to the recleaner pan 114' beneath the rack 28', and a similar pair of drive links 62' are connected in like manner through couplings 62'a to the recleaner pan beneath the rack 30'. These drive links are actuated through crank arms 60'b and 62'b mounted on the continuously rotated drive shaft 34'. Preferably these crank arms of successively adjacent rack-and-pan assemblies are mounted on the drive shaft at 180 degree angular spacing, so that the adjacent racks reciprocate oppositely from each other.

Within the machine frame a hood is formed comprising the side walls 250, 252 which have respective lower portions 250a and 252a turned inwardly to overlie the reciprocating recleaner pans 114' so that any peas or other fruit flung against the side walls drop onto the recleaning pan for ultimate delivery into the hopper of the discharge conveyor 230'. An upwardly directed baffle plate 254 mounted on the frame bar 256 is located between the lowermost rotary beater 72' and the rack mechanism as a means to intercept peas which may be driven against it by the rotary beaters, and to direct such peas downwardly onto the inturned wall portion 252a.

These and other features and aspects of the invention will be recognized from the foregoing disclosure of the presently preferred embodiments of the invention in representative applications.

I claim as my invention:

1. Recleaning apparatus to separate fruit from chaff comprising inclined support means onto which mixed fruit and chaff are deposited, drive means for said support means, operable to move said support means reciprocatively on a forward stroke to an elevated, advanced position and on a return stroke, effected at least substantially as abruptly as said forward stroke, to a depressed, return position, along a path of reciprocation which is inclined in the same sense but to a greater degree than the incline of said support means, said drive means being operable to drive the support means on its return stroke with an abruptness which leaves the chaff suspended in mid-air as the support means starts its return stroke and which effects completion of at least a major portion of the return stroke by the time the suspended chaff settles by gravity back down upon the support means whereby the chaff recontacts the support means at a location nearer the latter's upper edge than initially, such that a succession of such reciprocations causes progressive incremental migration of the chaff up the support means while the relatively dense fruit tumbles down the incline of the support means, wherein the support means comprises an inclined reciprocated plate, said apparatus further comprising an elongated scraper blade, means supporting the blade in contact with the plate's upper surface with the length of the blade extending substantially along the incline of the plate, said means supporting the blade being operable to guide such blade for reciprocation back and forth across the plate, and drive means operable to effect such reciprocation of the blade back and forth across the plate accompanying reciprocation of the plate.

2. The recleaning apparatus defined in claim 1, and further including an inclined chute for depositing the mixed fruit and chaff on the support means, said chute have a lower end portion substantially overlying and directed along the downward incline of the support means, whereby the denser fruit discharging by gravity from said such lower end has a longer horizontal trajectory than does the relatively lightweight chaff, so that fruit and chaff are deposited on the support means at relatively low and high positions thereon, respectively.

3. The apparatus defined in claim 1, wherein the means supporting and the means driving the scraper blade comprise a reversely threaded feed screw extending transversely across the plate, nut means engaging the screw and supporting the blade to move the blade back and forth across the plate during unidirectional screw rotation, and means to so rotate said screw by and during reciprocation of the plate, including ratchet means mounted on the screw, a relatively stationary support, and a link operatively connected at one end to the stationary support and at its opposite end operatively to the ratchet means to convert such plate reciprocation into rotation of said screw.

References Cited by the Examiner
UNITED STATES PATENTS

| | | |
|---|---|---|
| 412,005 | 10/89 | Smith. |
| 1,368,746 | 2/21 | Palmer et al. _____ 209—112 |
| 1,415,610 | 5/22 | Palmer et al. _____ 209—112 |
| 1,783,489 | 12/30 | Zeb. |
| 2,768,628 | 10/56 | Hermanson. |
| 2,909,282 | 10/59 | Simmons _____ 209—114 X |
| 2,934,072 | 4/60 | Mather et al. |

SAMUEL F. COLEMAN, *Acting Primary Examiner.*

FRANK L. ABBOTT, ERNEST A. FALLER, JR., CARL W. ROBINSON, *Examiners.*